(No Model.)
G. M. ANDREWS.
CALCULATING INSTRUMENT.
No. 486,070. Patented Nov. 15, 1892.
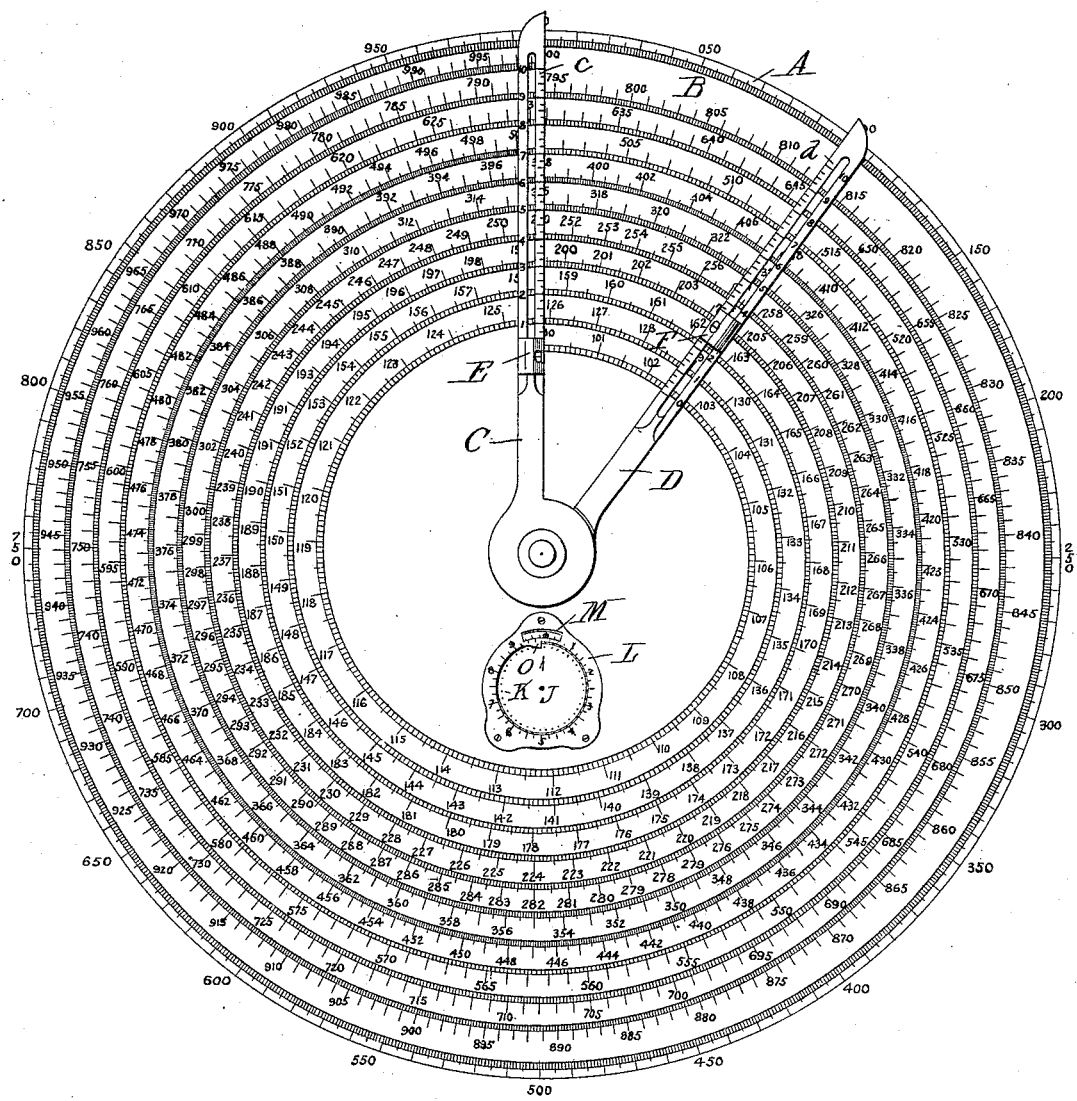
Witnesses —
Walter P. Keene
Henry E. Cooper
Inventor
George M. Andrews
by
Thomas J. Johnston,
Attorney.

UNITED STATES PATENT OFFICE.

GEORGE M. ANDREWS, OF BOSTON, MASSACHUSETTS.

CALCULATING-INSTRUMENT.

SPECIFICATION forming part of Letters Patent No. 486,070, dated November 15, 1892.

Application filed February 20, 1892. Serial No. 422,254. (No model.)

*To all whom it may concern:*

Be it known that I, GEORGE M. ANDREWS, a citizen of the United States, residing at Boston, in the county of Suffolk and State of Massachusetts, have invented certain new and useful Improvements in Calculating-Instruments, of which the following is a specification.

My invention relates to calculators, and particularly to those affording graphic solutions of mathematical problems, and has for its object to provide a means of presenting the logarithmic table by scale in such a manner that all the processes in which such a table can profitably be used are brought directly before the eye and can be readily stated and solved.

My calculator consists of a plane surface upon which are three elements—viz., a circumscribing circle, a spiral of ten coils, and a pair of radial arms separably movable, having graduated edges, and also carrying movable indicators.

In the drawing hereunto annexed and hereby made a part of this specification, which shows an embodiment of my invention, the figure is a view of my improved calculator.

Referring by letter, A represents the circumscribing circle.

B represents the spiral of ten coils.

C and D represent the arms of the dividers, bearing the graduations c and d.

E and F are the indicators, which are movable to and fro on the arms.

The circle A must be truly described and truly subdivided, as hereinafter explained, its accuracy being essential to the correctness of the calculations performed. The diameter of this circle is optional, but governs somewhat the size of the apparatus. The number of subdivisions may vary. In this instrument I have shown one hundred principal parts, and each of these again subdivided into ten equal parts, making one thousand equal subdivisions in the total circumference. Other numbers may be selected for the subdivision, as the object to be gained is attained by any number of subdivisions upon the circle, which multiplied by the number of turns of the spiral will equal ten thousand—viz., one thousand multiplied by ten, or five hundred multiplied by twenty, or four hundred multiplied by twenty-five, &c.

While the number of places of the logarithmic mantissa has no known limit, it is found by experiment that a table to five places will give accurate results to the same number of places of natural numbers. To increase the scale beyond this number will so enlarge it as to make it unwieldy, and even one more place will not enhance the value or correctness of the result to such a degree as would make it advisable to go beyond the number of units mentioned above—viz., ten thousand.

The spiral B must be a true arithmetical spiral—that is, it must have a regular radial increment by which each turn will always be equidistant from those on either side of it—and it must also be concentric with the divided circle. It will not answer the purpose to describe the false spiral by changing centers with giving and changing radii, (although a line thus drawn closely resembles the true spiral.) It may be described with comparative accuracy by winding about a center-pin whose circumference equals the desired space between the spirals a non-elastic but flexible band or cord as many times as the number of spirals desired, then fastening the pin or pencil at the radius desired for the starting-point, and by a steady centrifugal force applied in connection with a forward movement unwinding the cord or band. The result will be a fair accomplishment of the desired result. A better way is to secure the plane surface to the face-plate of a lathe, having attachments to draw a describing-point regularly outward at a right angle to the axis of the lathe as the face-plate is made to revolve, so that the point, while constantly departing from the center, will in one revolution of the face-plate have moved away from the center through the given space required for separation of the spirals. The principal reason for using a spiral band is continuity. I have found by experiment that the desired results cannot be attained by means of concentric circles. In the present instance I have used a spiral of ten turns, which, in connection with the one thousand subdivisions upon the outer circle, enables me to locate upon the spiral any portion I wish of the ten thousand units I employ.

It will readily be seen that it is possible to subdivide any one turn of this spiral into one thousand equal parts, thus giving in ten turns ten thousand subdivisions. Therefore if I can locate upon this spiral any part desired of the ten thousand units of a logarithmic table I have by scale, measuring along the spiral from zero, a numerical value corresponding to the number of units taken from such a table. Beginning at the zero-point of the spiral I have therefore in its first three hundred and sixty degrees the first thousand, in the next the second thousand, and so on up to the completion of the ninth and the tenth thousand units, as before mentioned.

In the construction of the scale I take the logarithmic values or units corresponding to any natural numbers desired. It is then obvious that the scale value of any number must be such a part of these ten thousand imaginary parts as is indicated by its logarithm. Suppose it to be .5234. From the foregoing it will be readily seen that the location must fall in the fifth spiral. Therefore the first figure on the right of the decimal-point of the logarithm always designates the spiral. The balance of 234 is two-hundred-and-thirty-four one-thousandths of that spiral, as will be recalled, (each spiral being subdivided into one thousand equal parts.) The fractional part of the spiral I ascertain by means of the outer circle. By a straight-edge supported at the center of the instrument, (the same from which the outer circle and spirals were described,) placed at the two hundred and thirty-fourth subdivision on the outer circle, I cut the fifth spiral, and at this intersection I mark the point, these giving five thousand two hundred and thirty-four parts of the whole, which is the value by scale, measuring from zero of the spiral, corresponding to the natural number opposite this value in the logarithmic table, which natural number I can therefore place upon the instrument at this point. By this method all the points of the subdivision are obtained. For greater accuracy of subdivision a temporary circle of large radius may be used, and by so doing it is quite possible to employ another place in the logarithmic table. By making, for example, ten thousand subdivisions in the outer temporary circle I get six figures of logarithms, and can thus graduate the ten spirals more accurately than by the method given above. This therefore shows one of the uses of the circumscribing circles. I complete by this method the subdivision of the true spiral and designate the location upon it by the natural numbers which correspond. This gives a reading accurate for the greater portion of the scale to five places. (In the instrument shown in the drawing I have only so subdivided it for one-half its length.) It will be noticed that this radial system gives a gain in the spacing of the scale in proportion to the size or radial value of the spiral, which, so far as I am advised, is not possible with any other apparatus of equal simplicity.

By means of the two arms pivoted at the center of the instrument, upon whose faces are drawn graduations corresponding to the number of spirals and their quarters, I am enabled to lay off upon these graduations the number of the spiral and, acting like a pair of dividers, the fractional part of any spiral. Arranging this pair of arms or dividers so that they will act together and carrying this fraction or arc to any other part of the instrument, I can then measure any numerical value, carry it to another, and (by a method explained below) ascertain the sum of the values thus measured or their difference. The method, therefore, must be to add spirals and their fractions for multiplications in natural numbers, subtract them for divisions, perform both operations for proportions, and to read from the natural numbers on the scale to their logarithms for powers and roots.

The operation of my device is as follows, it being premised that where the words "index-number" are used I mean the scale-numbers upon the divider or "index-arms" C and D.

*Multiplication.*—Set one arm at zero. Set the other at first number or multiplicand on the spiral. Set the indicator over the same number and note its reading on the arm. Revolve arms either way—right or left, as may be convenient—setting first arm at second number or multiplier. Set the indicator of that arm over the number and note reading. Add readings of indicators. If their total is over ten, the balance will be the spiral number which in conjunction with the second arm gives the result. Noting that only complete spirals are counted, for which reason the first spiral, which is fractional, is counted as zero, the total of index-numbers to be used is less than ten in every case. Therefore if the sum of two index-numbers exceeds ten subtract that much from the sum, as six and one-fourth plus seven equals thirteen and one-fourth, from which take ten, leaving three and one-fourth, which is the number to be used.

Example: 205×211. Set the left arm C at zero. Set the right arm D at 205 on the spiral. Note the index-number on the arm D, which is 3. Revolve both arms, keeping them the same distance apart until arm C is at 211 on the spiral. Note the index-number, which is $3\frac{1}{4}$. Add the index-numbers. Their sum is $6\frac{1}{4}$. At $6\frac{1}{4}$ on arm D read the answer, which is 43,255.

*Division.*—This operation is the reverse of the preceding, the index-numbers being subtracted instead of being added. It is performed as follows: Set one arm at the divisor upon the spiral. Set the other at the dividend. Note index-numbers and subtract that on the divisor-arm from that on the dividend-arm. Then revolve both arms, preserving their relative position until the divisor-arm is at zero. At the point upon the dividend-arm indicated by the difference of index-numbers above noted find the answer.

Example: 84,500÷325. Set the arm C at 325, the divisor. Note the index-number, which is 5. Set the arm D at 845, the dividend, and note the index-number, which is 9¼. Revolve both arms till arm C is at zero. Take the difference of the index-numbers, which is 4¼. At 4¼ on arm D read the answer, which is 260. It will readily be seen that this operation may be reversed by setting the arm C at zero, bringing arm D to the divisor and noting the index-number, then revolving both arms till arm D is at the dividend and noting the index-number. Subtract the first index-number from the second, and at the point on the arm C indicated by their difference find the answer. If the index-number on the dividend-arm be the smaller, add ten to it and subtract the divisor, as before.

*Proportion.*—This is a combination of the two preceding operations, and the computer will find many ways to combine them. A convenient method is as follows: Set the arm C on the first term of the proportion and note its index-number. Set the arm D at the second term and note its index-number. Revolve both arms until the arm C is over the third term and note that index-number also. Add the second and third index-numbers and subtract the first from their sum. The result is the number on the arm D at which will be found the answer.

Example: 320 : 515 :: 430 : x. Set the arm C at 320. The index-number is 5. Set the arm D at 515. The index-number is 7. Revolve both arms till arm C is at 430. Note its index-number, which is 6¼. Add second and third index-numbers 7 and 6¼. Their sum is 13¼. Subtract therefrom the third 5. The result is 8¼. At 8¼ on arm D find the answer, which is 692.

*Powers and roots of numbers.*—It is evident that if I can construct the instrument from logarithmic units to a scale of natural numbers I can reverse the operation and as easily read again the logarithm from the natural number. Therefore to get the root of a number set either arm over the number. The first number of the logarithm at right of decimal-point is the spiral number. Balance is read on outer circle—say 3 √3375. Spiral number is 5. Balance is 283 nearly, (on outer circle.) The characteristic of the logarithm is 3; logarithm is 3.5283. Dividing by 3, the index-number of the root equals 1.1761. First figure on right of decimal-point is 1, which is the spiral number. Set arm on 761 (the balance) on outer circle, and on 1 of spiral, in conjunction with arm, we have 15, the answer. Two items will have to be observed. First, the characteristic being 1, the answer occupies two places of numerals. The logarithm proper is about one and three-fourths spirals, which is true on the instrument, as 15 falls between the first and second spirals at 1¾ on the index, nearly. Involution is performed nearly in the same way—multiplying the logarithm by the power desired instead of dividing. It will thus be seen there is no practical limit to the capabilities of this instrument in either involution or evolution.

For present purposes I have used mental operations for adding and subtracting index-numbers; but there are several methods by which these operations may be performed automatically.

The parts designated by the letters J, K, K, L, M, and O (shown in the drawing) represent a small disk J, upon the edge of which are ten equal divisions numbered from "0" to "9." These again are divided into quarters, and opposite each division is a hole K. These numbers are covered by an outer circle L, correspondingly graduated, having an opening M, at which results may be read. O is a stop.

The operation of the device is as follows: Place a pencil-point in the hole K corresponding to the index-number which it is desired to add (the dial being first set at zero) and revolving the dial to the left, bring the point to the stop O, place the pencil-point in the hole K corresponding to the second index-number, and again revolve the dial toward the left to the stop. At the opening M will be found the sum of the two numbers, dropping all tens.

*Angular functions.*—Operations involving logarithms of the trigonometric functions may be solved by the instrument, as shown and described. For this purpose tables of sines and tangents, arranged for convenient reference, may be printed on slides moving in the back of the plane surface upon which the spiral is laid out or hinged thereto, or the figures may be taken from the ordinary book-tables. No operation of my instrument being affected thereby, no more full and explicit directions for such use are necessary. The graduations which I have preferred to affix to the radial arms for dividers are not absolutely essential to the operation of the device; but I have found them in practice to be of great convenience, and to facilitate the operation of the calculator. It will be seen that the operator may, by counting the spirals from the center outward and observing in which quadrant of the circumscribing circle the arm to be read happens to be, easily determine what the index-number is which he wishes to use. Indeed by the method indicated a much greater accuracy in the reading may be obtained. The operator may read, as just explained, the spiral number, and may then read on the outer circle the fractional part of the spiral which he wishes to use. It is found, however, that for practical purposes reading to quarters of a turn gives sufficiently-accurate results.

I am aware of the patent to J. R. Haight and J. M. Segur, No. 268,221, November 28, 1882, wherein certain particular and limited uses of a plane logarithmic spiral are explained. Such an arrangement is different from mine, as it employs a geometric curve, while I prefer an arithmetic. It is also adapted to find particular results only, while my calculator is mathematically general as to the operations described in the foregoing specification. I therefore do not claim the construction shown in such Letters Patent; but

What I claim, and wish to protect by Letters Patent of the United States, is—

1. A calculating device consisting of a subdivided spiral having a regular radial increment and a pair of radial arms bearing graduations upon their edges, substantially as described.

2. A device for performing calculations, consisting of a subdivided plane spiral having a number of turns surrounded by a subdivided circle concentric therewith and a pair of radial arms, the number of turns of the spiral multiplied by the number of subdivisions of the circle being equal to the units of the logarithmic table, substantially as described.

3. A device for performing calculations, consisting of a plane spiral of ten turns, a pair of radial dividing-arms, and a circumscribing circle concentric with the spiral, the spiral and the circumscribing circle being subdivided, substantially as described.

4. A calculating device consisting of a subdivided plane spiral having thereon natural numbers in positions relative to their logarithms, a subdivided circle concentric therewith, and a pair of radial arms, substantially as described.

5. A calculating device consisting of a subdivided plane spiral having thereon natural numbers in distances from zero of the spiral proportional to their logarithms and a pair of radial arms bearing graduations upon their edges, substantially as described.

6. A calculating device consisting of a subdivided plane spiral having thereon natural numbers at distances from zero of the spiral proportional to their logarithms, a subdivided circle concentric therewith, and a pair of radial arms, substantially as described.

7. A calculating device consisting of a subdivided plane spiral having thereon natural numbers at distances from zero of the spiral proportional to their logarithms, a subdivided circle concentric therewith, and a pair of radial arms bearing graduations upon their edges, substantially as described.

8. A calculating device consisting of a subdivided plane spiral having thereon natural numbers at distances from zero of the spiral proportional to their logarithms, a subdivided circle concentric therewith, and a pair of graduated radial arms movable separately or in unison and carrying indicators, substantially as described.

9. A calculating device consisting of a subdivided spiral of ten turns, a circumscribing circle subdivided into a thousand parts, and a pair of radial arms movable separately or in unison, the spiral having thereon natural numbers at distances from zero proportional to their logarithms, substantially as described.

10. A calculating device consisting of a spiral bearing natural numbers logarithmically located, as herein set out, a subdivided circle surrounding it, and a pair of graduated radial arms carrying indicators, substantially as described.

In witness whereof I have hereunto set my hand in the presence of two witnesses.

GEORGE M. ANDREWS.

Witnesses:
JAMES C. DAVIS,
AMORY ELIOT.